Figure 1:
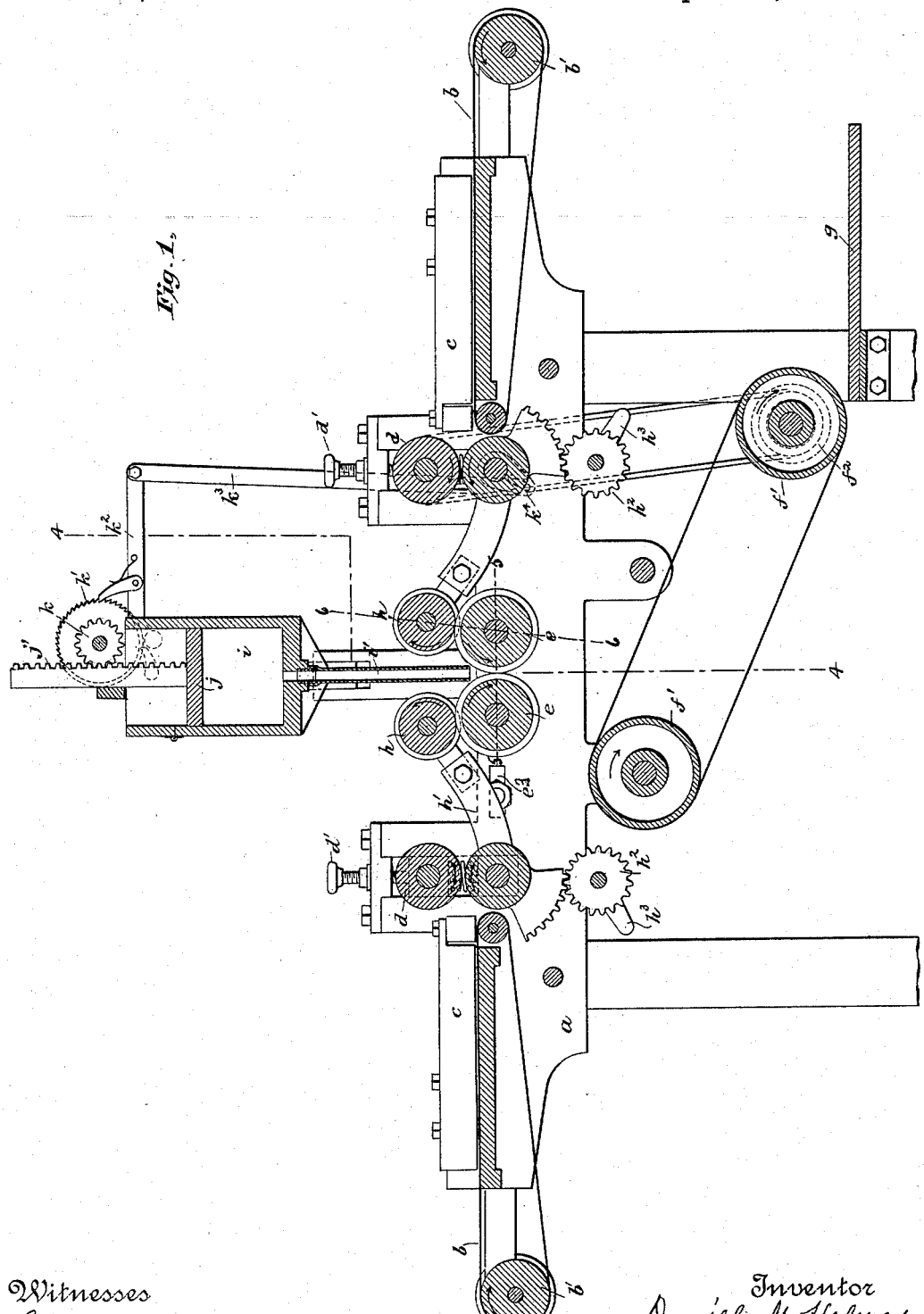

(No Model.) 5 Sheets—Sheet 1.

D. M. HOLMES.
MACHINE FOR FORMING ARTICLES OF PASTRY OR CONFECTIONERY.

No. 518,454. Patented Apr. 17, 1894.

Witnesses
Geo. W. Breck
Henry W. Lloyd

Inventor
Daniel M. Holmes
By his Attorneys
Witter & Kenyon (No Model.) 5 Sheets—Sheet 3.

D. M. HOLMES.
MACHINE FOR FORMING ARTICLES OF PASTRY OR CONFECTIONERY.

No. 518,454. Patented Apr. 17, 1894.

Witnesses
Geo. W. Breck
Henry W. Lloyd

Inventor
Daniel M. Holmes
By his Attorneys
Witter & Kenyon (No Model.) 5 Sheets—Sheet 4.
D. M. HOLMES.
MACHINE FOR FORMING ARTICLES OF PASTRY OR CONFECTIONERY.
No. 518,454. Patented Apr. 17, 1894.
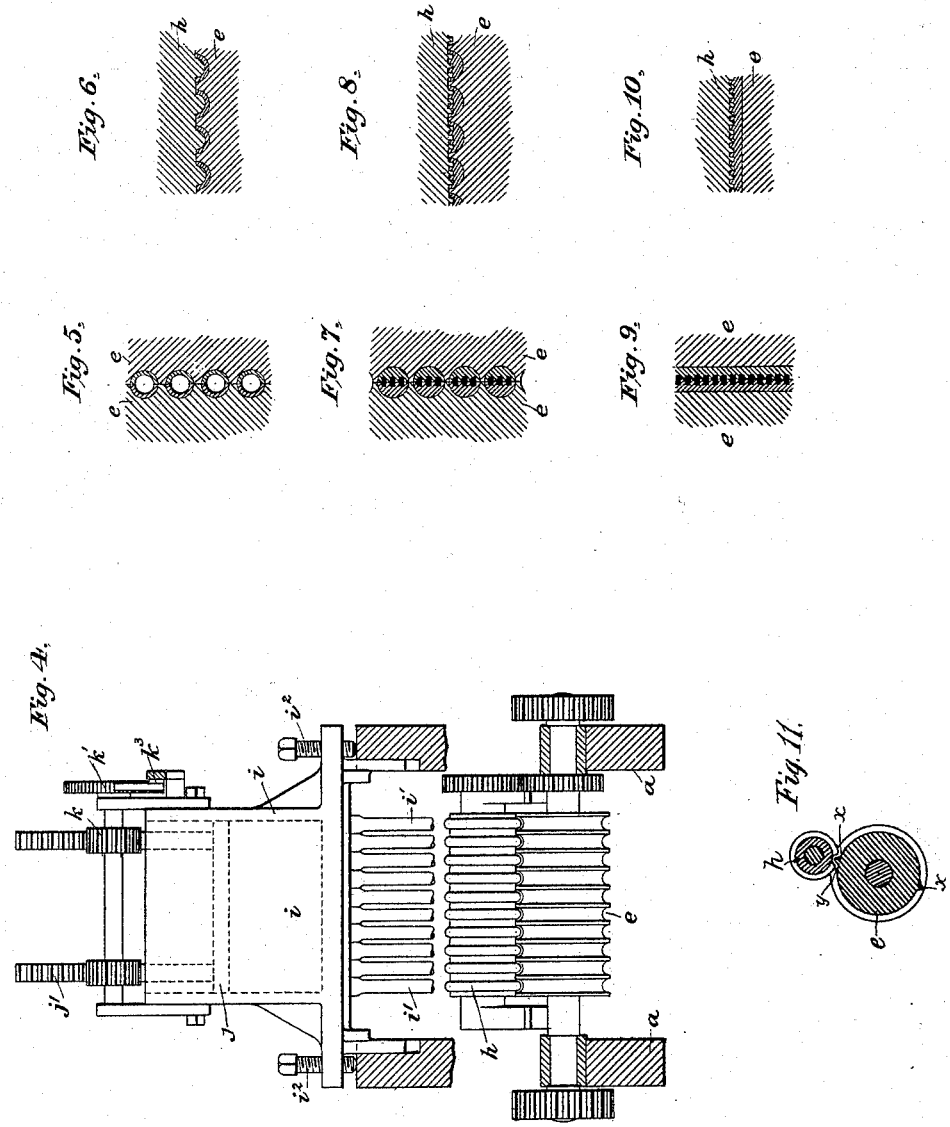
Witnesses
Geo. W. Breck
Henry W. Lloyd
Inventor
Daniel M. Holmes
By his Attorneys
Witter & Kenyon
THE NATIONAL LITHOGRAPHING COMPANY,
WASHINGTON, D. C.

(No Model.) 5 Sheets—Sheet 5.
D. M. HOLMES.
MACHINE FOR FORMING ARTICLES OF PASTRY OR CONFECTIONERY.
No. 518,454. Patented Apr. 17, 1894.
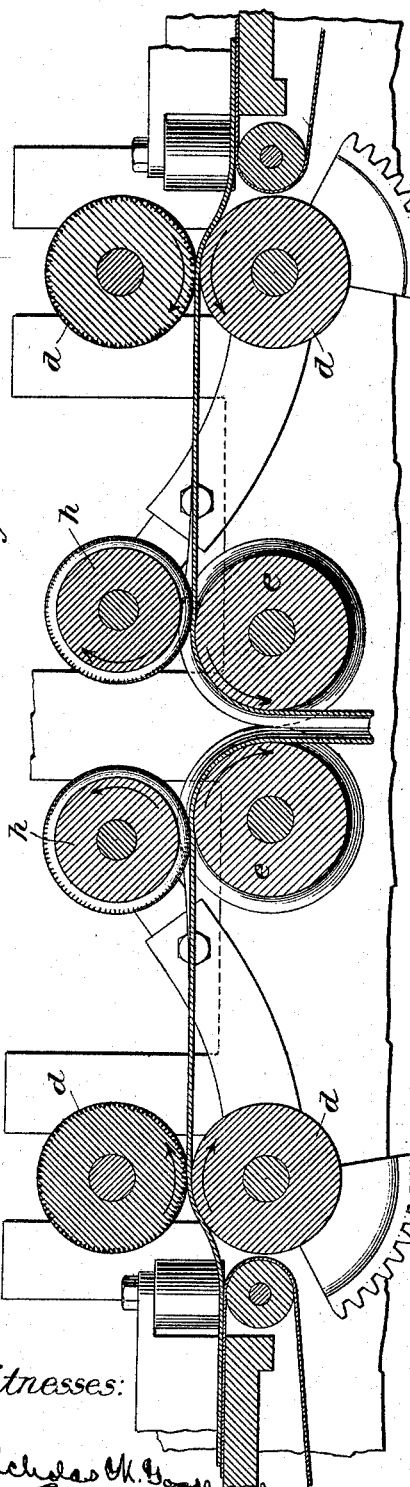
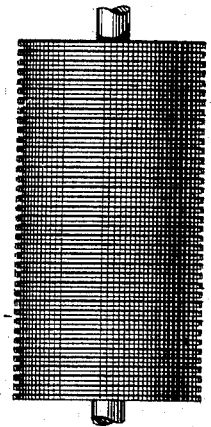
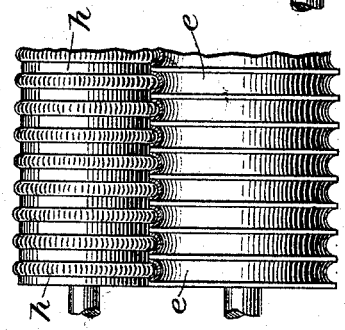
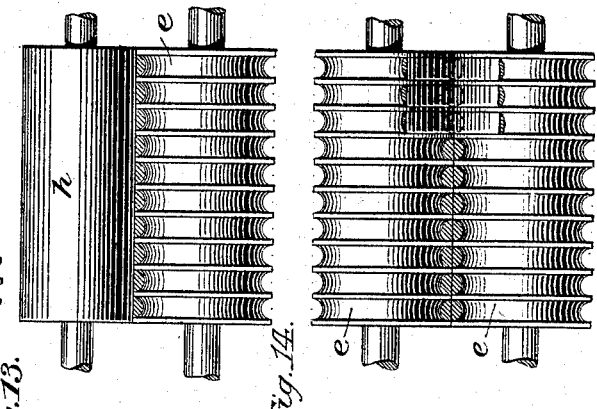
Witnesses:
Inventor:
Daniel M. Holmes,
By his attorneys,
Witter & Kenyon

UNITED STATES PATENT OFFICE.

DANIEL M. HOLMES, OF ARLINGTON, NEW JERSEY, ASSIGNOR TO JOHN R. VAN DERVEER, OF NEW YORK, N. Y.

MACHINE FOR FORMING ARTICLES OF PASTRY OR CONFECTIONERY.

SPECIFICATION forming part of Letters Patent No. 518,454, dated April 17, 1894.

Application filed July 26, 1890. Serial No. 359,984. (No model.)

*To all whom it may concern:*

Be it known that I, DANIEL M. HOLMES, a citizen of the United States, residing in Arlington, Hudson county, State of New Jersey, have invented certain new and useful Improvements in Machines for Forming Articles of Pastry or Confectionery, of which the following is a specification, reference being had to the accompanying drawings, which form a part hereof.

My improvements consist of devices for working paste, dough or other viscous material. Forming devices are provided having the shape of portions of the article and arranged and operated so as to impart to sheets or strips of paste or dough the shape or form of such portions, and feeding devices are provided arranged and operated to feed the formed portions or sheets or strips toward each other and bring them together, and pressure or uniting devices are provided for causing the portions of the article to unite and form entire articles, some of these feeding devices operating also as forming devices, and some of these forming and feeding devices operating also as pressure or uniting devices as will hereinafter appear. When the completed articles are to be in hollow form the edges of the portions are brought together and caused to unite by the feeding and pressure devices. When my entire invention is used, filling devices are arranged and operated to feed suitable filling substance to and between the portions or sheets or strips as they are brought together; and the pressure devices then cause the portions and filling substance to unite; or when the articles are to consist of an envelope of hollow form and a filling substance, the pressure devices cause the edges of the portions to unite and inclose the filling substance, or cause the portions and filling substance to unite, said filling substance either partially or wholly intervening between the portions.

My invention is adapted for producing articles of tubular form or articles consisting of a tubular envelope and a suitable filling. My invention is also adapted to produce solid or porous cylindrical sticks. The articles are preferably produced in continuous lengths and may be subsequently cut into smaller lengths.

My invention is also adapted for forming hollow or solid candy or pastry figures.

Figure 2:
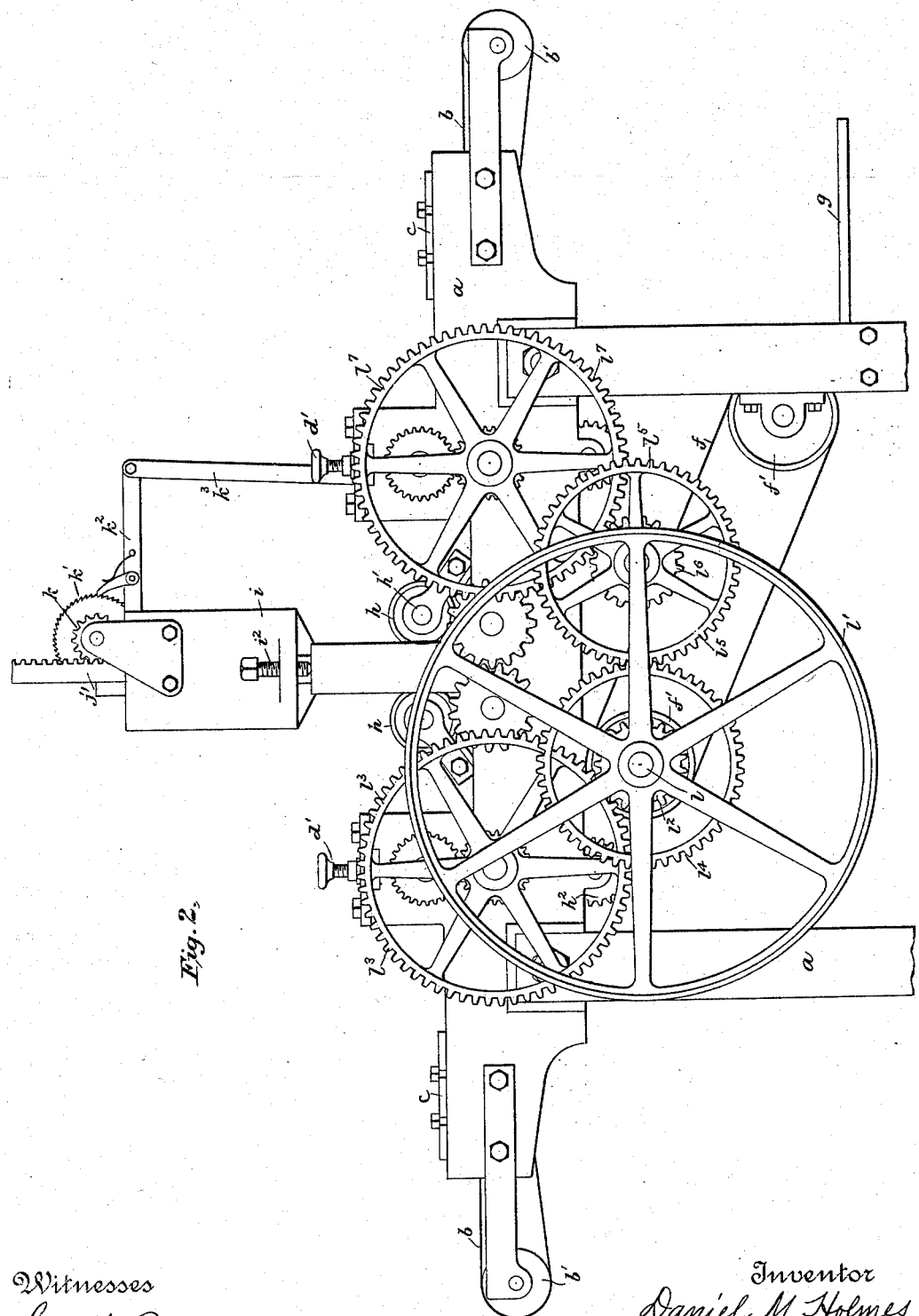
Figure 3:
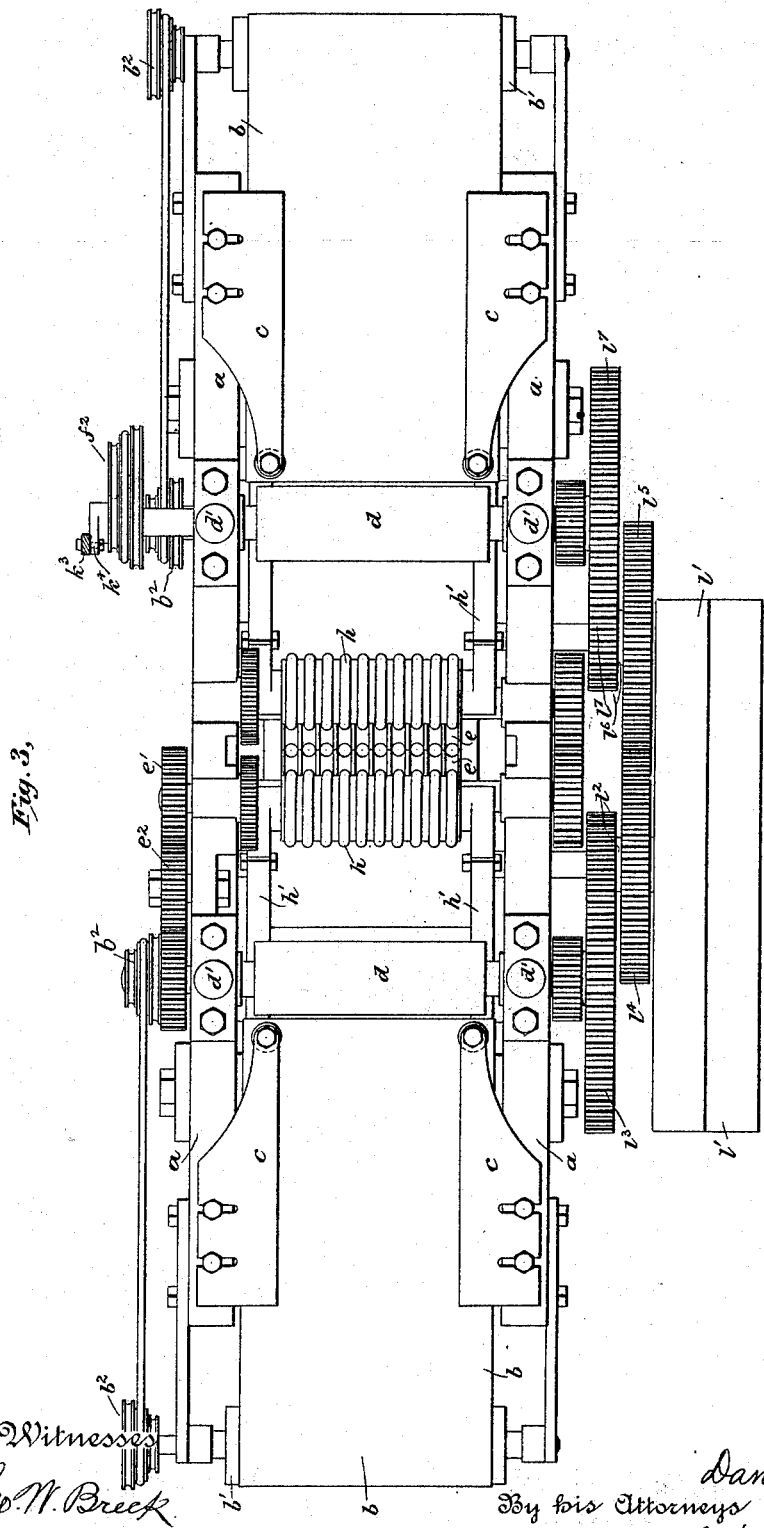

In the accompanying drawings to which I will now refer, Figure 1 is a longitudinal central section of a complete machine embodying my invention. Fig. 2 is a side elevation of the same. Fig. 3 is a plan view. Fig. 4 is a transverse section on the line 4—4, Fig. 1. Fig. 5 is an enlarged section of part of the meeting edges of two of the forming rollers on the line 5—5, Fig. 1, and Fig. 6 is a similar section on the line 6—6, Fig. 1. Figs. 7 and 8 are similar sections of a modified form of forming rollers. Figs. 9 and 10 are similar views of another modification. Fig. 11 is a vertical section showing another modification of the forming rollers. Fig. 12 is an enlarged longitudinal section similar to Fig. 1, but showing a portion only of the machine. Fig. 12ª is an enlarged elevation of a portion of one of the upper and one of the lower rollers. Fig. 13 is an enlarged elevation and Fig. 14 an enlarged plan of a modified arrangement of forming rollers. Fig. 15 is an enlarged elevation of one of the modified forms of forming rollers.

The various working parts of the machine are supported and fitted in suitable bearings in a frame work comprising the side frame $a\ a$, and suitable tie bars and cross frames. The paste or dough is fed into the machine from the two opposite ends thereof, suitable aprons $b\ b$, mounted on rollers $b'\ b'$ being provided at these points. Each apron $b$ passes over a table bridging across the side frames and supporting the apron. Adjustable guide pieces $c\ c$ are arranged just above these aprons and each guide piece is provided at its inner end with a guide roller. These guide pieces insure the proper feeding forward of the paste or dough. From the guide pieces and apron the strips of paste or dough pass through the feeding devices and through the forming devices and are fed toward each other. The feeding devices comprise the rollers $d\ d$, which are arranged adjacent to the aprons $b$, and also the rollers $e\ e$ and $h\ h$, which are arranged at about the center of the machine. The rollers $d\ d$ act to feed the paste or dough forward, and also to form the dough into sheets of the desired thickness, and I therefore designate them as feeding and sheet forming rollers. The rollers $h\ h$ and $e\ e$ act to feed the paste or dough forward, and at the same time to shape or form and unite the portions of the article produced and, taken together, are designated as forming rollers, the rollers $h\ h$ being designated as auxiliary forming rollers, and the rollers $e\ e$ as forming and uniting rollers. The feeding and sheet forming rollers $d\ d$ are fitted to rotate in boxes in the side frames. There are two of these feeding and sheet forming rollers alongside of each apron. These two rollers are arranged one above the other and the bearing boxes of the upper roller slide freely in the side frame and are supported by springs between them and the lower boxes and adjusted to regulate the distance between the two rollers by means of hand-screws $d'$, bearing against the tops of the boxes. To insure proper feeding of the paste and prevent slipping I prefer to longitudinally groove the upper rollers $d$. Such grooves would be very fine, being only deep enough to insure sufficient grip, as shown in the enlarged section, Fig. 12. From the feeding and sheet forming rollers $d\ d$, the sheets of paste or dough pass over the rotating forming and uniting rollers $e\ e$, and the two sheets of paste from the opposite sets of rollers are guided around the peripheries of these rollers until they meet and unite and pass downward to a suitable discharging apron $f$, which carries them to a table $g$, from which they are removed by the operators. The forming and uniting rollers $e\ e$ in the main views of the drawings are provided with grooves semi-circular in cross section. The auxiliary forming rollers $h\ h$ are shown arranged above the forming and uniting rollers $e\ e$, and are provided with projecting ridges which are adapted to enter the grooves in the forming and uniting rollers $e\ e$, leaving sufficient space between the ridges and grooves to shape the paste into semi-form. To insure proper feeding of the paste between the rollers $h$ and $e$, I prefer to slightly groove or mill the outer portions of the ridges of the rollers $h$, as shown in the enlarged views Figs. 12 and $12^a$. Between the grooves upon the rollers $e\ e$ are formed narrow ledges and these ledges come into contact with smooth surfaces on the rollers $h\ h$, between the ridges of such rollers $h\ h$. The metallic contact of these parts cuts or separates the sheet of paste into several strips, each strip filling a groove and thus being shaped to semi-tubular form. This is clearly indicated in Fig. 6, which shows a section of the semi-tubes or forms and of a portion of the rollers $e$ and $h$. The two sets of shaped semi-forms of paste are carried toward each other upon the rollers $e$, and at the point where the two rollers $e$ come in contact with each other the edges of the semi-tubes or forms are brought into adhesive contact with the edges of opposite semi-forms, and these edges unite and thus complete tubes are formed. Fig. 5 shows a section of the tubes and of a portion of the rollers $e\ e$ at this point.

A filling device consisting of a reservoir containing suitable filling substance is located directly over and between the rollers $e\ e$, and is provided with ducts comprising outlets and conduits for feeding such filling substance into the tubes at the point where the entire tubes or forms are shaped from the semi-tubes or forms by the adhesion of their edges. This reservor $i$ is adjustably held in the side frames and is provided with tubes $i\ i'$, which pass from the bottom of the conduit to a point just over the uniting point of the semi-tubes or forms. The adjusting screws $i^2\ i^2$ passing through lugs projecting from the sides of the reservoir rest upon the frame and serve to adjust the reservoir and attached tubes $i'$. A device is provided in this reservoir for automatically controlling the supply of filling substance, which consists of the plunger $j$, fitting within the reservoir and pressing down upon the upper surface of the substance therein. Racks $j'$ extend upward from this plunger and mesh into pinions $k$ secured to a shaft fitted to rotate in bearings attached to the reservoir $i$. A ratchet wheel $k'$ is also secured to this shaft, and a pawl mounted on a rocking lever $k^2$ rotates the ratchet wheel shaft and pinions and thus presses the plunger downward and forcibly feeds the filling substance to the tubes. The rocking lever $k^2$ is operated by a connecting rod $k^3$ connected at its lower end to a crank on the shaft of one of the feed rollers $d$. The crank pin $k^4$ which forms this connection is adjustably held in a slot in the crank so that the amount of movement imparted to the rock-lever and the rate of feed of the plunger and the quantity of filling substance fed into the tubes may be controlled as desired.

It is evident that the automatic feeding device of the reservoir may be adjusted to supply the tubes with any desired quantity of filling substance. In the production of stick candy or other articles having a central core of one material and an outer envelope or lining of another and different material, the paste which is shaped into the tubes would be made of the material of the outer envelope and the filling substance of the filling material.

If the machine is to be used for making hollow tubes or other hollow articles without filling substance, the reservoir will not be used and may be disconnected from the moving parts of the machine, or removed from the machine.

In the enlarged view, Fig. 12 the reservoir of filling material has been removed, and the machine is producing hollow tubes.

Motion is imparted to the various operating parts of the machine from the driving shaft $l$ provided with suitable driving pulleys $l'$. A gear wheel $l^2$ is mounted on the shaft $l$ and meshes into a large gear $l^3$ mounted on the shaft of the lower left hand feed roller $d$. Another gear wheel $l^4$ is mounted on the driving shaft $l$ and connected by intermediate gears $l^5$ $l^6$ to the large gear wheel $l^7$ on the shaft of the lower right hand feed roller $d$. The right hand feed rollers $d$ are geared together as also are the left hand feed rollers $d$. Cone pulleys are mounted on the shaft of each lower feed roller $d$ and are connected by belts with the cone pulleys $b^2$ on the shafts of the outer rollers $b'$ of the feeding aprons. The forming and uniting rollers $e$ are geared together and the left hand roller $e$ is provided with a gear wheel $e'$ connected by the intermediate gear $e^2$ with a gear wheel on the shaft of the lower left hand feed roller $d$. The auxiliary forming rollers $h\ h$ are each geared to the forming and uniting rollers $e$. The discharging apron $f$ is mounted on rollers $f'$. The upper roller $f'$ is mounted loosely on the driving shaft $l$ and turns freely thereon. The lower roller $f'$ is fixed upon a shaft and receives motion from the upper right hand feed roller shaft, being connected therewith by means of cone pulleys $f^2 f^2$ and the belt passing over the same.

The auxiliary forming rollers $h\ h$ are each provided with means for raising them up and away from the forming and uniting rollers $e$. The bearings of these rollers $h$ are in arms $h'$ fitted loosely upon the shafts of the lower feed rollers $d$. Each of these arms $h'$ is provided with a toothed sector meshing into a pinion $h^2$ on a shaft provided with a crank handle $h^3$. When the crank handle is rotated the roller is raised up. The arms $h'$ are each made in two parts held together by a bolt so that the outer parts and attached rollers $h$ may be removed and other rollers of the same or of different form substituted in their place.

For producing different classes of work I use rollers of various shapes, some of which are shown in the drawings. When cylindrical sticks of confectionery are to be produced I sometimes use a serrated auxiliary forming roller, such as shown in Fig. 15, in place of each roller $h$, the forming and uniting roller $e$ remaining as shown in the main views of the drawings. This arrangement is shown in the enlarged sections Figs. 7 and 8. Fig. 8 shows a section of a portion of the meeting edges of the rollers $e$ and $h$ and the semi-cylinders formed between them, and Fig. 7 shows a section of a portion of the meeting edges of the two rollers $e\ e$ and the completed cylinders formed between them. The serrated rollers produce longitudinal grooves in the upper face of the paste or dough and when these faces are brought together in passing between the rollers $e$ they are caused to unite, leaving holes or pores through the stick. These holes or pores may be charged with filling substance or not, as desired. Again, instead of the ridged rollers of the main views of the drawings or of the serrated rollers above described, I may use smooth auxiliary forming rollers $h$ in conjunction with the grooved forming and uniting rollers $e$, thereby producing solid unperforated sticks. This arrangement is shown in Figs. 13 and 14, Fig. 13 showing an elevation of a smooth roller $h$ and of a grooved roller $e$, with the shaped semi-cylinders of paste in section, and Fig. 14 showing a plan of two grooved rollers $e$ with some of the shaped semi-cylinders of paste in section at their uniting point. Another arrangement is shown in Figs. 9 and 10. Here the forming and uniting rollers $e$ are smooth and the auxiliary forming rollers $h$ are serrated. The sheets of paste are not divided into separate strips but remain in single strips or sheets. In passing between the rollers $e$ the serrated faces of the sheets of paste are brought together and caused to unite, leaving holes or pores through the middle of the compound sheet thus produced. Filling substances may be fed between these sheets so as to fill the pores, or the rollers $e$ may be far enough apart to allow the filling substance to pass between the tops of the ridges or serrations. In the latter case the rollers $e$ will cause the filling substance to adhere to the paste or dough and this filling substance alone will hold the two parts together.

When the auxiliary forming rollers $h$ are raised up away from the forming and uniting rollers, the machine may be used to form sheets into solid sticks. The sheets will then pass over the forming and uniting rollers $e$ and down between them, and the shaping and uniting of the parts will take place simultaneously as the paste is fed between the rollers $e$.

When the articles to be produced are of short lenghs I sometimes partly cut or separate them into these lengths by projections within the grooves of the rollers $e$. Such construction is shown in Fig. 11, and the projections are there lettered $x$. Corresponding indentations are formed in the ridges of the rollers $h$. One of such indentations is shown and is lettered $y$. It is evident that the grooves or circumferential concavities in the rollers $e$ and $h$ may be shaped to produce other articles than straight sticks.

The gearing joining the feed rollers $d\ d$ and the forming and uniting rollers $e$ may be changed so as to adjust the relative speed of these rollers. This is provided by mounting the gear $e^2$ upon a stud which is adjustably clamped in a slot in the side frame. This slot is shown in Fig. 1 and is lettered $e^3$. Gears of different sizes are provided and the gears shown may be interchanged and thus any desired adjustment secured.

It is evident that the sheet forming operation may be performed by other means than the rollers $d\ d$, and that in some cases it may be desirable to form the sheets of paste or dough in a separate machine or by hand, and to feed these sheets directly to the forming rollers *e e* and *h h*.

What I claim as new, and desire to secure by Letters Patent, is—

1. A machine for making articles of pastry or confectionery, consisting of feeding and sheet forming rollers in combination with auxiliary forming rollers and with forming and uniting rollers whereby portions of the article are fed toward each other and formed and then brought together and caused to unite and form entire articles, substantially as set forth.

2. A machine for making articles of pastry or confectionery, consisting of feeding and sheet forming rollers in combination with auxiliary forming rollers and with forming and uniting rollers, whereby portions of the article are fed toward each other and formed and then brought together and caused to unite, and with a reservoir provided with ducts for supplying suitable filling substance to and between the formed portions, substantially as set forth.

3. In a machine for forming articles of pastry or confectionery, the combination of the feeding apron *b*, the rollers *d d* and the rollers *e* and *h*, and mechanism for operating the above parts, substantially as described.

4. In a machine for forming articles of pastry or confectionery, the combination of the feeding aprons *b b*, the rollers *d d*, the rollers *e e* and *h h*, and suitable filling devices and mechanism for operating the above parts, substantially as described.

5. In a machine for forming articles of pastry or confectionery, the combination of the feed apron, *b*, the rollers, *d d*, the rollers, *e* and *h*, and the rock arm, *h'*, and mechanism for operating the above parts, substantially as set forth.

6. In a machine for making articles of pastry or confectionery, the combination of the feeding aprons *b b*, the rollers *d d*, the rollers *e e* and *h h*, and the reservoir *i*, for filling material having outlets or spouts, the plunger *j*, therein, the automatic operating mechanism thereof consisting of the levers $k^2$ $k^3$ bearing a pawl entering the teeth of a ratchet-wheel $k'$, said wheel being connected to a pinion working in a rack connected to the plunger, and mechanism for operating the above parts, substantially as set forth.

DANIEL M. HOLMES.

Witnesses:
HENRY D. WILLIAMS,
SIDNEY MANN.